(12) United States Patent
Liang

(10) Patent No.: US 6,494,752 B1
(45) Date of Patent: *Dec. 17, 2002

(54) BATTERY TERMINAL CONNECTOR

(76) Inventor: Shih-Tsung Liang, No. 10, Lane 31, Ta-Feng St., Neitsou Tsun, Lu-Chu Hsiang, Taoyuan County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/993,470

(22) Filed: Nov. 27, 2001

(51) Int. Cl.[7] ................................................ H01R 4/42
(52) U.S. Cl. .......................................... 439/764; 439/763
(58) Field of Search ................................. 439/764, 756, 439/761, 762, 763, 759

(56) References Cited

U.S. PATENT DOCUMENTS

| | | | | |
|---|---|---|---|---|
| 3,704,440 A | * | 11/1972 | Bradley | 439/762 |
| 5,316,505 A | * | 5/1994 | Kipp | 439/762 |
| 5,711,688 A | * | 1/1998 | Matsumaga et al. | 439/762 |
| 6,162,098 A | * | 12/2000 | Cheng et al. | 439/763 |
| 6,334,797 B1 | * | 1/2002 | Liang | 439/763 |

* cited by examiner

*Primary Examiner*—Hien Vu
(74) *Attorney, Agent, or Firm*—Rosenberg, Klein & Lee

(57) ABSTRACT

A battery terminal connector is constructed having a mounting part and a wire distribution part integral with the mounting part, the mounting part having two clamping arms adapted for securing to a terminal of a battery by a screw bolt, the clamping arms defining a circular mounting hole and a gap in communication between the circular mounting hole and external space, the circular mounting hole having spiral grooves extended in reversed directions across each other, the wire distribution part having a forwardly extended opening and two wire distribution portions formed integral with the clamping arms and separated by the forwardly extended opening for receiving a respective electric wire.

2 Claims, 5 Drawing Sheets

BATTERY TERMINAL CONNECTOR

BACKGROUND OF THE INVENTION

The present invention provides an improvement on the battery terminal connector filed under U.S. Ser. No. 09/652, 675 now U.S. Pat. No. 6,334,797. The improvement of the present invention greatly reduces the manufacturing cost of the battery terminal connector and, enables the mounting part to be positively secured in close contact with the battery terminal after installation.

SUMMARY OF THE INVENTION

It is one object of the present invention to provide a battery terminal connector, which can easily be installed with less effort. It is another object of the present invention to provide a battery terminal connector, which can positively be secured to the battery terminal to achieve satisfactory electric conducting effect. To achieve these and other objects of the present invention, there is provided a battery terminal connector, which comprises a mounting part and a wire distribution part integral with the mounting part. The mounting part comprises two clamping arms adapted for securing to a terminal of a battery by a screw bolt. The clamping arms define a circular mounting hole and a gap in communication between the circular mounting hole and external space. The circular mounting hole has grooves in it for enabling the peripheral wall of the circular mounting hole to be positively maintained in close contact of the terminal of the battery after installation of the battery connector. For example, the circular mounting hole has spiral grooves extended in reversed directions across each other. Longitudinal grooves may be added to the peripheral wall of the circular mounting hole and extended across the spiral grooves. The wire distribution part comprises a forwardly extended opening, and two wire distribution portions formed integral with the clamping arms and separated by the forwardly extended opening for receiving a respective electric wire. The forwardly extended opening greatly increases the resilient power of the clamping arms, enabling the clamping arms to be turned inwards and outwards within a wide range for easy installation without causing damage.

DETAILED DESCRIPTION OF THE PREFERRED EMBODIMENT

Figure 1:
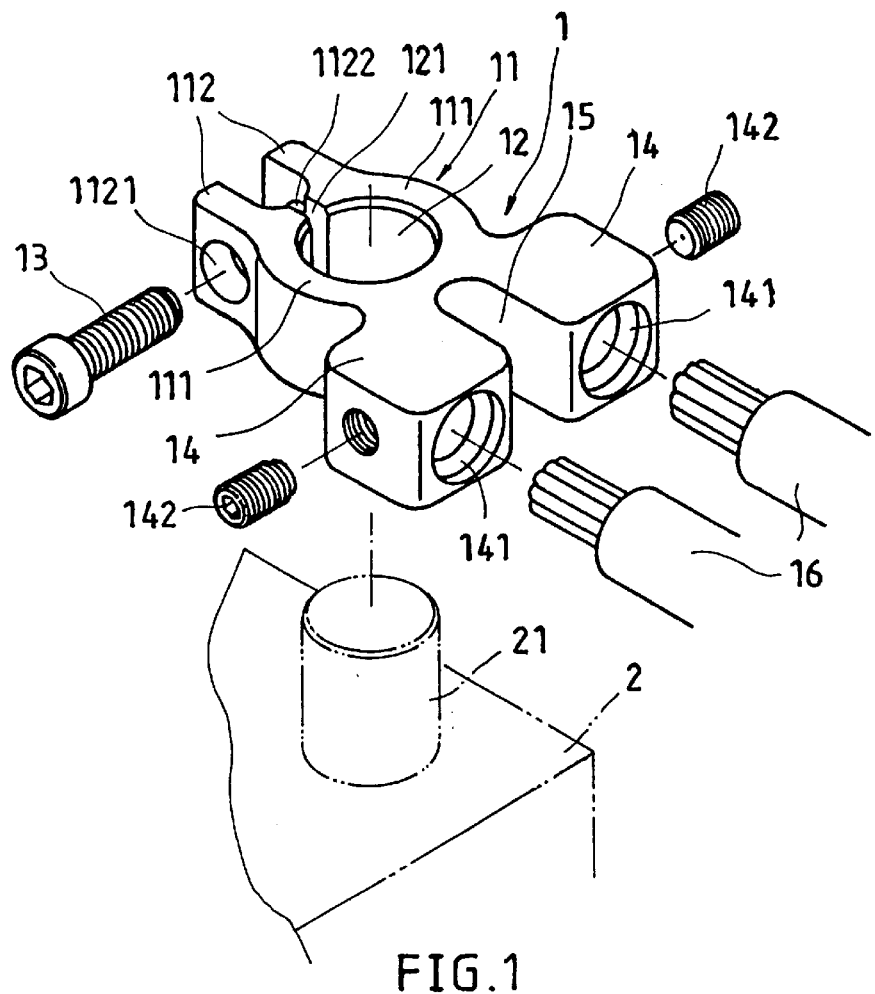
FIG. 1 illustrates a battery terminal connector according to one embodiment of the present invention.
Figure 2:
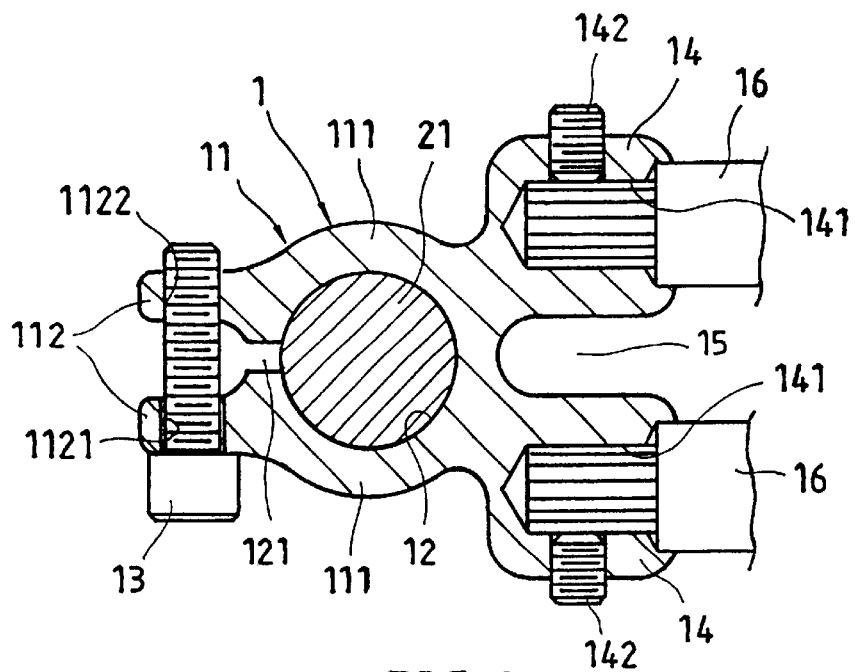
FIG. 2 is a sectional assembly view of FIG. 1.

Referring to FIGS. 1 and 2, a battery terminal connector 1 is shown comprising a metal mounting part 11, and a metal wire distribution part integral with the mounting part 11. The mounting part 11 comprises two clamping arms 111 arranged in parallel. The clamping arms 111 define a circular mounting hole 12 and a narrow gap 121 in communication with the circular mounting hole 12, each having a front extension portion 112. A through hole 1121 is made through the front extension portion 112 of one clamping arm 111, and a screw hole 1122 is made through the front extension portion 112 of the other clamping arm 111. When in use, the circular mounting hole 12 is coupled to the terminal 21 of the battery 2, and then a screw bolt 13 is inserted into the through hole 1121 and threaded into the screw hole 112 to secure the clamping arms 111 firmly to the terminal 21 of the battery 2. The aforesaid wire distribution unit comprises a forwardly extended opening 15, which divides the wire distribution unit into two wire distribution portions 14. The wire distribution portions 14 each comprise a front wire hole 141, which receives a respective electric wire 16. A tightening up screw 142 is threaded into a respective screw hole on each wire distribution portion 14 to secure the respective electric wire 16 to the respective wire hole 141, keeping the conductors of the respective electric wire 16 in close contact with the inside wall of the respective wire distribution portion 14. As indicated, the two wire distribution portions 14 are formed integral with the clamping arms 111 of the mounting part 11 and separated by the opening 15. This design enables the clamping arms 111 to be turned outwards and inwards relative to each other without causing damage.

Figure 3:
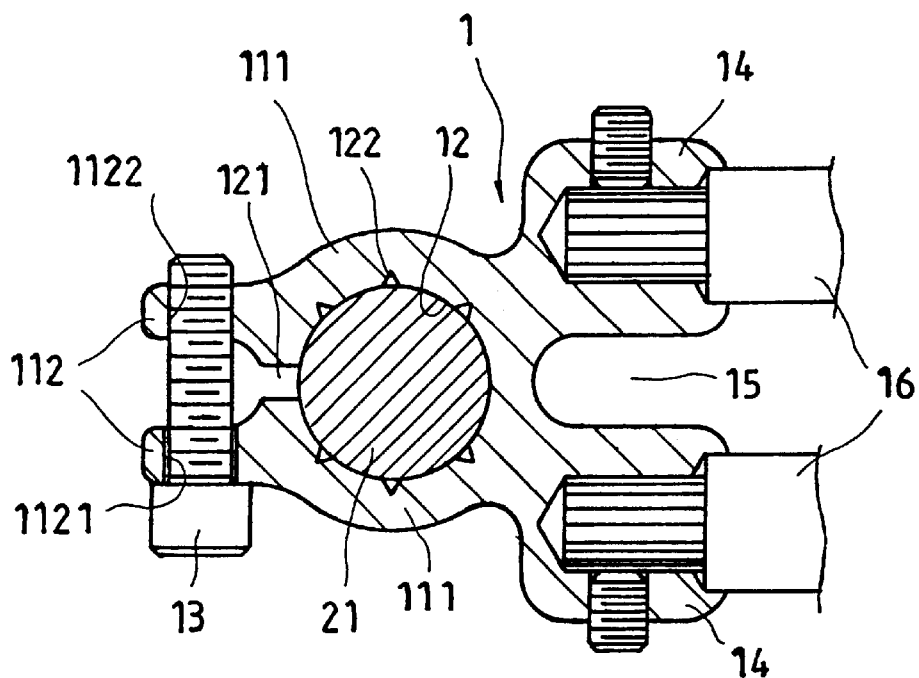
FIG. 3 is a sectional view of an alternate form of the present invention.

FIG. 3 shows an alternate form of the present invention. According to this alternate form, longitudinal grooves 122 are formed on the clamping arms 111 around the circular mounting hole 12 for enabling the clamping arms 111 to be positively secured to the terminal 21 of the battery 2 (see also FIG. 1).

Figure 4:
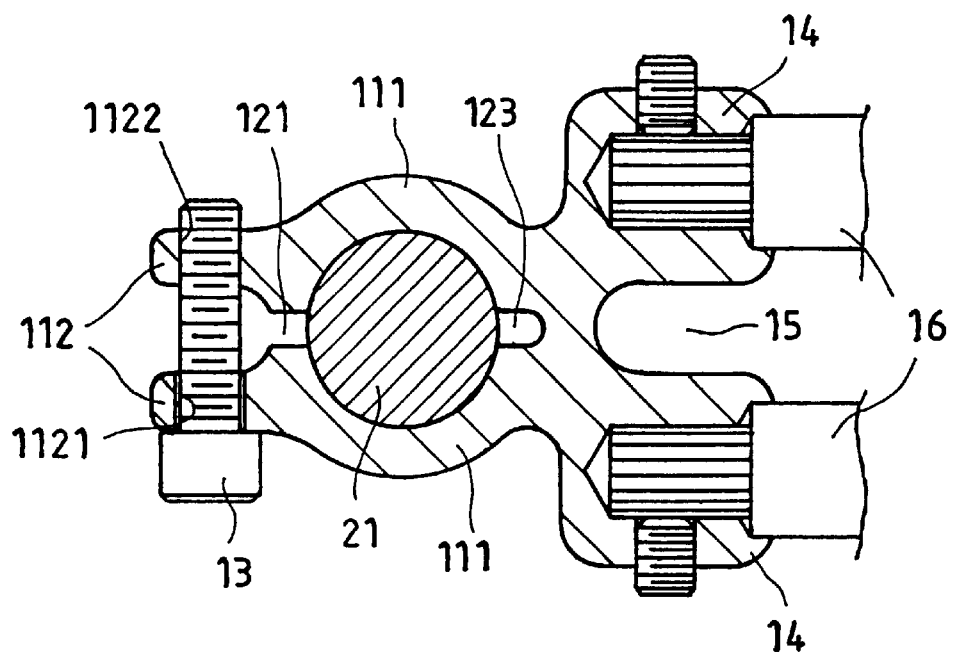
FIG. 4 is a sectional view of another alternate form of the present invention.

FIG. 4 shows another alternate form of the present invention. According to this alternate form, a notch 123 is formed in the mounting part 11 backwardly extended from the circular mounting hole 12 toward the opening 15 of the wire distribution part and opposite to the narrow gap 121. The notch 123 enables the clamping arms 111 to be opened wider without causing damage.

Figure 5:
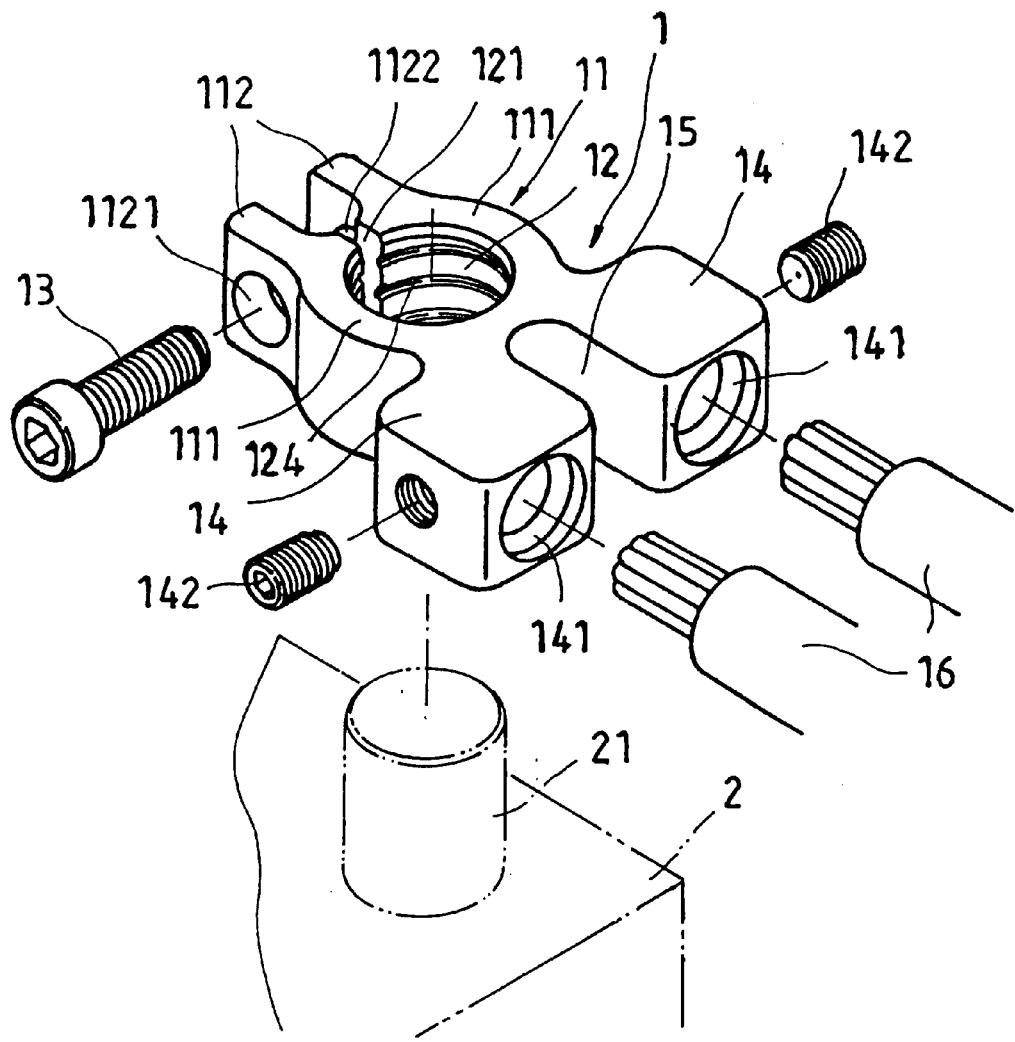
FIG. 5 is an exploded view of still another alternate form of the present invention.
Figure 6:
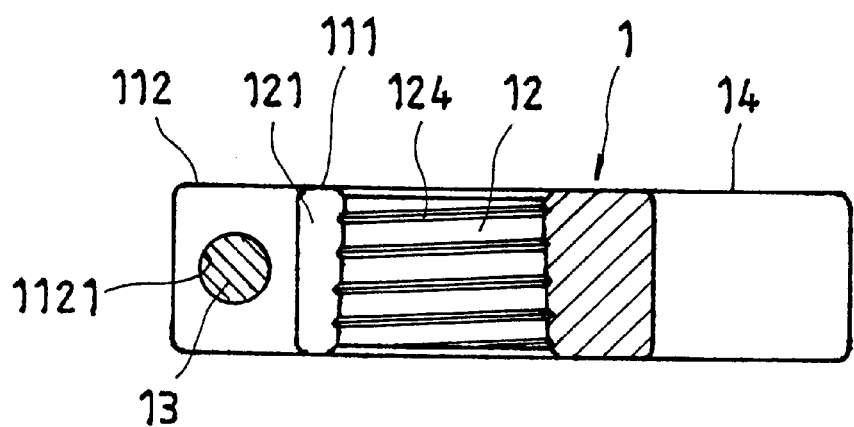
FIG. 6 is a sectional assembly view of a part of the battery terminal connector shown in FIG. 5.

FIGS. 5 and 6 show still another alternate form of the present invention. According to this embodiment, the battery terminal connector 1 has a spiral groove 124 in the circular mounting hole 12, which ensures positive contact between the peripheral wall of the circular mounting hole 12 of the battery terminal connector 1 and the terminal 21 of the battery 2.

Figure 7:
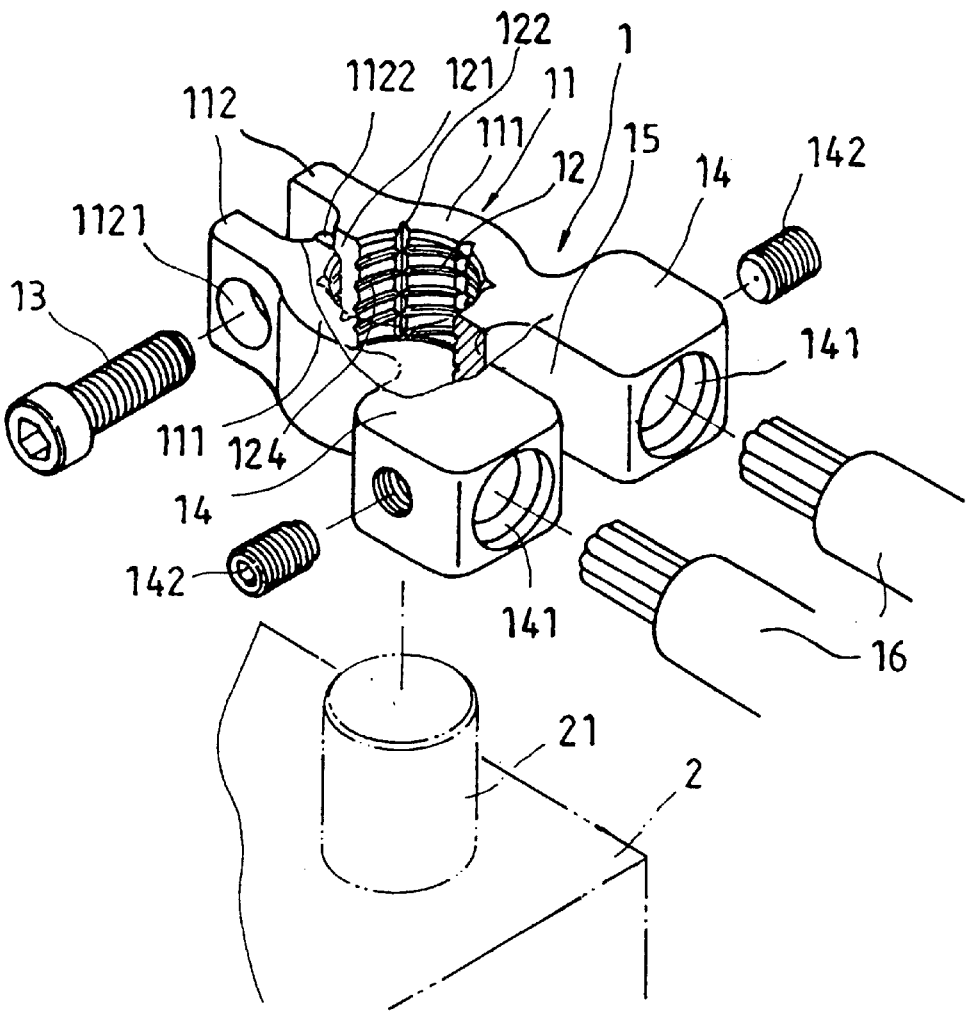
FIG. 7 is an exploded view of still another alternate form of the present invention.
Figure 8:
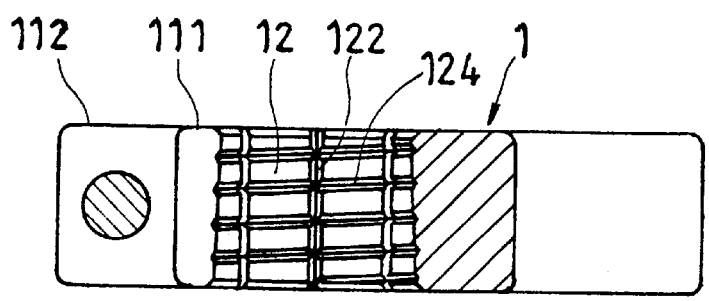
FIG. 8 is a sectional assembly view of a part of the battery terminal connector shown in FIG. 7.

FIGS. 7 and 8 show still another alternate form of the present invention. According to this embodiment, the battery terminal connector 1 has a spiral groove 124 in the circular mounting hole 12 and longitudinal grooves 122 in the circular mounting hole 12 across the spiral groove 124. The spiral groove 124 and the longitudinal grooves 122 ensure positive contact between the peripheral wall of the circular mounting hole 12 of the battery terminal connector 1 and the terminal 21 of the battery 2.

Figure 9:
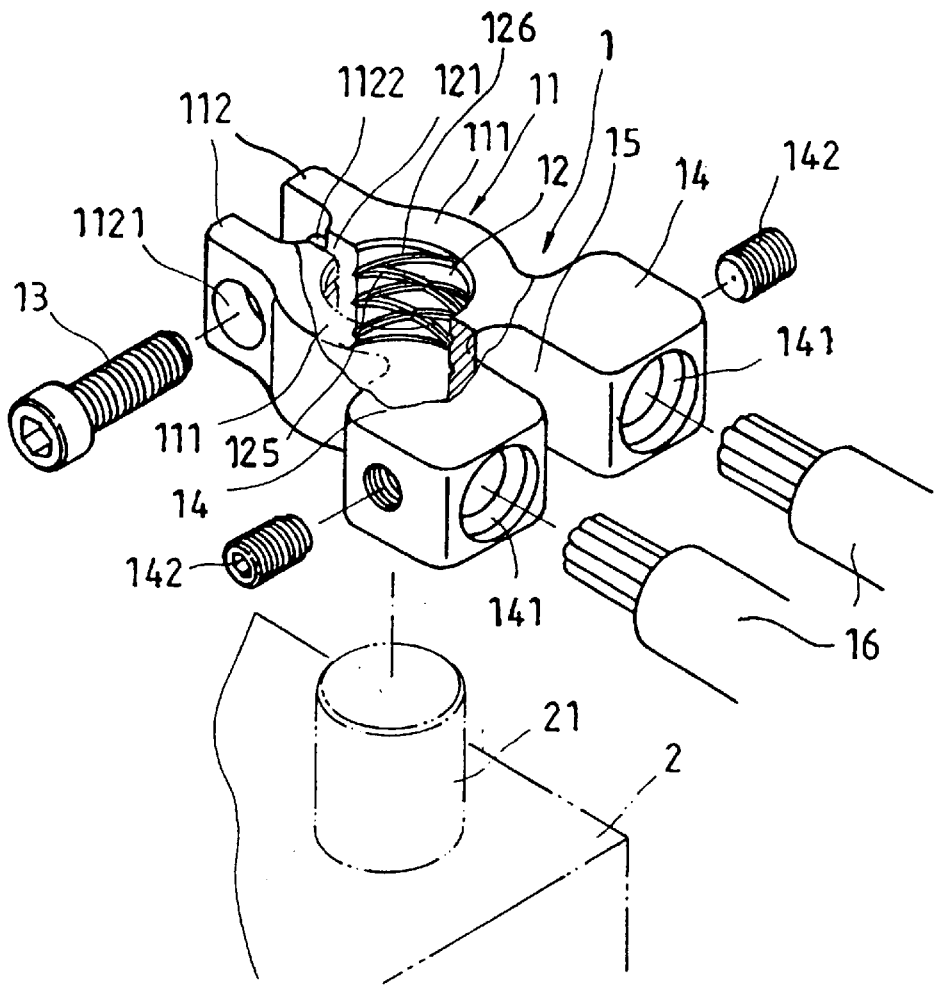
FIG. 9 is an exploded view of still another alternate form of the present invention
Figure 10:
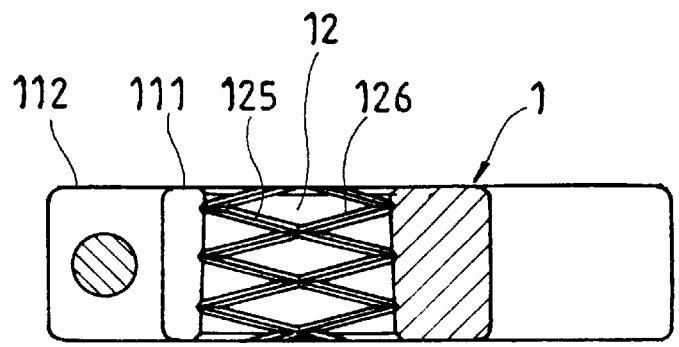
FIG. 10 is a sectional assembly view of a part of the battery terminal connector shown in FIG. 9.

FIGS. 9 and 10 show still another alternate form of the present invention. According to this embodiment, the battery terminal connector 1 has a right-hand spiral groove 125 and a left-hand spiral grove 126 extended across each other in the circular mounting hole 12. The right-hand spiral groove 125 and a left-hand spiral grove 126 ensure positive contact between the peripheral wall of the circular mounting hole 12 of the battery terminal connector 1 and the terminal 21 of the battery 2.

It is to be understood that the drawings are designed for purposes of illustration only, and are not intended for use as a definition of the limits and scope of the invention disclosed.

What the invention claimed is:

1. A battery terminal connector comprising a metal mounting part adapted for fastening to one terminal of a battery, and a metal wire distribution part formed integral with said mounting part and adapted for receiving electric wires, said mounting part comprising a first clamping arm and a second clamping arm arranged in parallel, said first clamping arm and said second clamping arm each having a front extension portion, a circular mounting hole defined between said first clamping arm and said second clamping arm and adapted for receiving one terminal of a battery, said circular mounting hole having at least one peripheral spiral groove extending from a top end to a bottom end of said circular mounting hole, a narrow gap extended from said circular mounting hole and separating said first clamping arm from said second clamping arm for enabling said first clamping arm and said second clamping arm to be attached to the terminal of the battery at two sides, a through hole formed through the front extension portion of said first clamping arm, a screw hole formed through the front extension portion of said second clamping arm, and a screw bolt adapted for mounting in the through hole on the front extension portion of said first clamping arm and threading into the screw hole on the front extension portion of said second clamping arm to secure said first clamping arm and said second clamping arm to the terminal of the battery, said wire distribution part comprising at least one forwardly extended opening, and a plurality of wire distribution portions respectively formed integral with said first clamping arm and said second clamping arm of said mounting part and separated by said forwardly extended opening and adapted to receive a respective electric wire.

2. The battery terminal connector of claim 1 wherein the at least one peripheral spiral groove of said circular mounting hole includes a left spiral groove and a right spiral groove extended across said left spiral groove.

* * * * *